GALVANIC ANODE

Original Filed April 21, 1969

Gordon L. Doremus &
Jack G. Davis
INVENTORS

BY

ATTORNEY

United States Patent Office

Re. 27,529
Reissued Dec. 12, 1972

27,529
GALVANIC ANODE

Gordon L. Doremus, 7555 Haywood Drive 77017, and Jack G. Davis, 3600 Montrose, Apt. 405 77006, both of Houston, Tex.

Original No. 3,616,422, dated Oct. 26, 1971, Ser. No. 817,916, Apr. 21, 1969. Application for reissue Aug. 7, 1972, Ser. No. 277,381
Int. Cl. C23f *13/00*
U.S. Cl. 204—197 14 Claims

Matter enclosed in heavy brackets [ ] appears in the original patent but forms no part of this reissue specification; matter printed in italics indicates the additions made by reissue.

ABSTRACT OF THE DISCLOSURE

A galvanic anode adapted particularly for the cathodic protection of relatively large diameter pipelines submerged in water bodies. The anode consists of *at least* a pair of [semicylindrical] *arcuate* segments constructed of a suitable galvanic metal and having completely embedded within the galvanic metal steel core or armature sections, adapted to be connected together to join the anode sections into a "bracelet" about the pipe.

*BACKGROUND OF THE INVENTION*

Cathodic protection of submerged pipe lines is currently accomplished by means of so-called bracelet anodes which conventionally consist of semicylindrical segments each fabricated from a plurality of arcuate anode segments, each of which has a longitudinal steel core protruding from the opposite ends thereof. The protruding ends of the cores are welded to semicircular steel bands external to the anode material. The construction of this type of anode is wasteful of labor in requiring multiple handling of the several pieces in forming each bracelet segment. Moreover, the resulting half-bracelets are mechanically weak and often badly deformed in shipping and handling. This is particularly true where anodes are required for relatively large diameter pipe lines, for example 24 inch and larger, for which a relatively large number of arcuate segments are required to make up each half bracelet. This conventional construction also results in a large area of exposed bare steel demanding protective current of its own from the anode material unless properly coated.

*SUMMARY OF THE INVENTION*

The deficiencies of the above-described conventional bracelet anodes are obviated by the *preferred* construction contemplated by the present invention wherein each half-bracelet is cast *preferably* as a continuous semicylindrical segment of anode metal in which is completely embedded, during casting of the anode, a concentric steel core or armature. The latter consists of a pair of spaced-apart, parallel straps made from mild sheet steel *preferably* cross-linked with small diameter steel rods. The ends of the cores protrude from the ends of the anode segments and are provided with offset portions of complementary shape adapted to form the joints by which the segments are connected together to complete the bracelet. Short bending tabs are provided for attachment to the armature joints for electrically connecting [the cores] *each strap* to the (cathodic) pipe metal to be protected.

Other and more specific objects and advantages of this invention will become more readily apparent from the following detailed description when read in conjunction with the accompanying drawing which illustrates a [useful] *preferred* embodiment in accordance with this invention:

Figure 1:
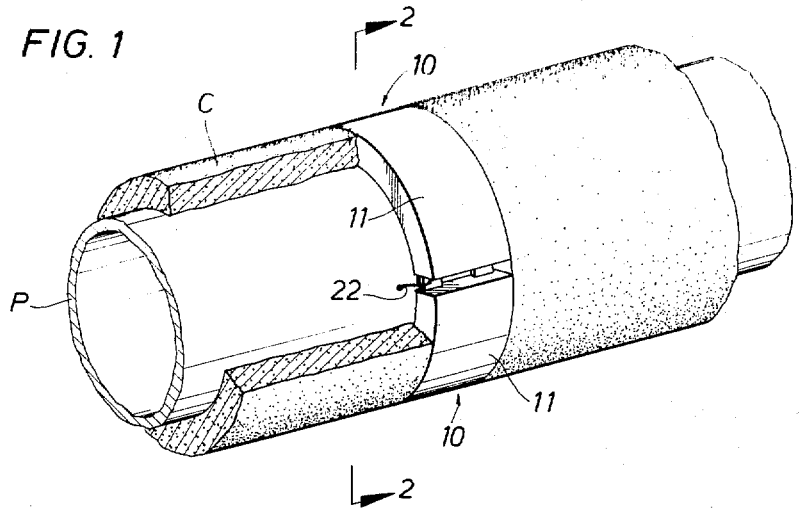
FIG. 1 is a perspective view, partly in section, showing the anode, in accordance with *the preferred embodiment of* this invention, mounted on a pipeline which is also encased in a protective and weighting coating of cement.

Referring to the drawing, the anode comprises *at least* a pair of identical *of arcuate but preferably* semicylindrical segments, designated generally by the numerals 10, and adapted when joined at their ends, to completely embrace a pipe P to be protected thereby. By reason of their identical construction, the description of one segment will be equally applicable to the other.

The segment 10 comprises a solid one-piece, semicylindrical body 11 of a suitable anode metal, such as zinc, aluminum, magnesium and alloys thereof, and is formed to an inner radius substantially equal to that of the outside of the pipe about which *it* is to be disposed so as to fit closely thereabout. The angular length of body 11 is made slightly less than 180° to provide a short open space between the opposed ends of the segments to accommodate the joints between the core sections by which the anode segments are connected together as will appear subsequently. The several end surfaces of body 11 are made substantially flat as illustrated.

Body 11 is provided with an armature or core, designated generally by the numeral 12, constructed of a metal cathodic to the anode metal. Preferably the metal is mild steel but may be any other metal sufficiently below steel in the electromotive force scale to be effective for cathodic protection. Core 12 is completely enclosed within the body of the anode metal which is cast about the core during forming of the anode segment.

Core 12 is fabricated from at least two bars 14—14 of flat steel disposed in spaced-apart, parallel relation. [and] *To enhance the mechanical and electrical integrity of the core, bars 14–14 are preferably* cross-linked by a plurality of angularly-spaced, small-diameter steel rods 16 to provide a latticelike structure is formed to a curvature substantially concentric with that of body 11 and on a radius intermediate the inner and outer radii of body 11, so as to lie closely adjacent the inner wall of body 11.

The length of *each of* bars 14 [are] *is* made sufficiently greater than the angular length of body 11 to project short distances from the opposite ends of the latter. One projecting end 18 of each bar is offset laterally outwardly to define a socketlike joint member for receiving the non-offset end 20 of the opposed core bar which forms the other joint member by which the cores of the opposed anode segments may be connected together as by welding, in order to complete the bracelet-type anode for the pipe about which it is mounted, as best seen in FIGS. 1 and 2.

Since these bracelet-type anodes are ordinarily installed over the conventional corrosion barrier coating on the pipe, short bonding cables 22 may be secured to the completed bracelets, preferably at the joints between the core segments, and suitably bonded to the pipe metal to complete the protective circuit.

Figure 2:
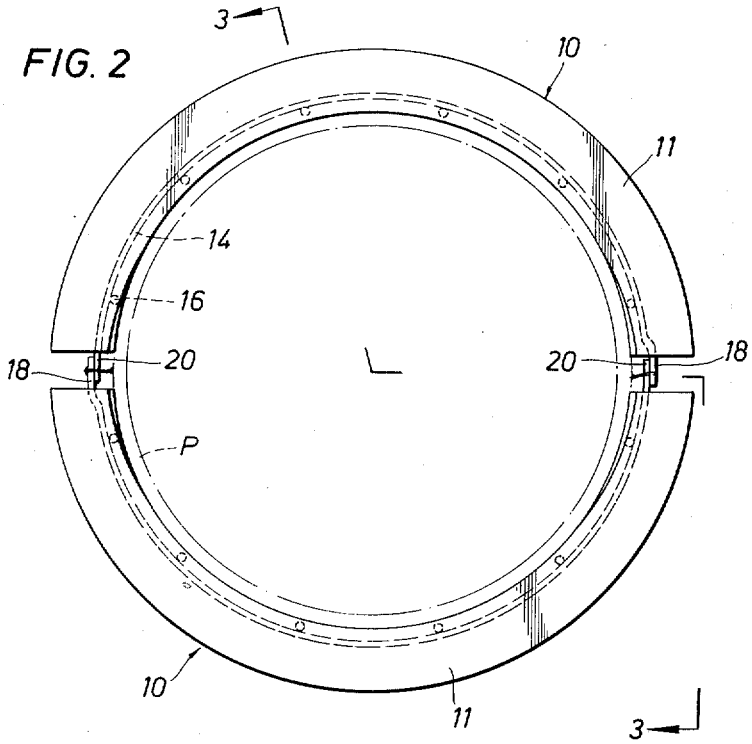
FIG. 2 is an end elevational view of the anode.
Figure 3:
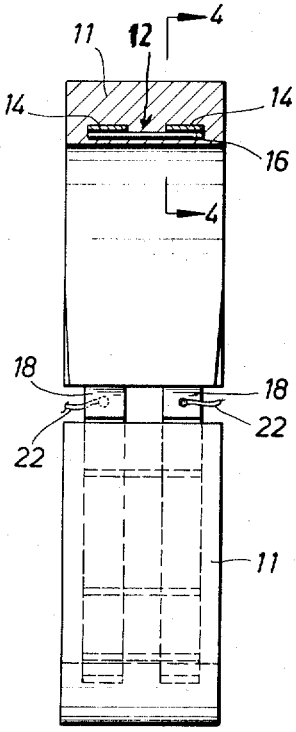
FIG. 3 is a side view partly in elevation and partly in section taken on line 3—3 of FIG. 2.
Figure 4:
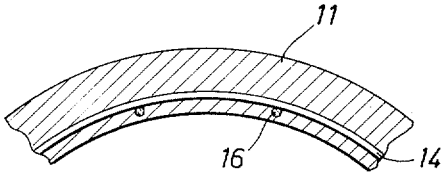
FIG. 4 is a fragmentary cross-sectional view taken along line 4—4 of FIG. 3.

When the described anodes have been placed about pipe P and the cores connected to the pipe, as seen in FIG. 1, the pipe, particularly if it is to be submerged in marine bodies, may be encased with cement C (FIG. 1) for weighting and additional protective purposes in accordance with conventional practices.

From the foregoing, it will be evident that the bracelet anodes [constructed] *based on the preferred construction* in accordance with this invention, provide a simple, easily fabricated, solid structure, which may be installed with a minimum of labor cost to provide highly effective cathodic protection for a pipeline.

*While the preferred embodiment of this invention desirably employs only a single pair of segments to minimize the amount of exposed steel external to the cores and to minimize the number of required welds, it will be apparent to those skilled in the art that a plurality of such segments could be employed without departing from the scope of this invention, since the steel bands within the segments would be entirely embedded and only their end portions projecting from the segments would be exposed.*

What we claim and desire to secure by Letters Patent is:

1. A galvanic anode for cathodic protection of pipe lines, comprising:

(a) a pair of semicylindrical segments adapted to embrace a pipeline, each segment comprising:

(1) a continuous, semicylindrical body of a galvanic anode metal;

(2) A metal core cathodic to the anode metal concentrically embedded entirely within the anode metal adjacent the inner periphery of said body;

(2) said core comprising:

(a) at least two axially-spaced, parallel metal bars;

(b) a plurality of angularly-spaced metal rods interlinking said bars; and (c) each of said bars having end portions projecting from opposite, longitudinal edges of the anode body to form joint elements for connecting one of said segments to the other in pipe-embracing relation.

2. An anode according to claim 1 wherein said anode metal is a member selected from the group consisting of aluminum, zinc, magnesium, and alloys thereof.

3. An anode according to claim 1 wherein said core is constructed of mild steel.

4. An anode according to claim 1 including electric current conductor elements connected to said core for electrically connecting the core to the pipeline.

5. An anode according to claim 1 wherein one of said end portions is offset laterally to receive the non-offset end portion of an opposed bar to form the joint therebetween.

*6. A galvanic anode for cathodic protection of pipelines, comprising:*

*(a) a pair of semicylindrical segments adapted to embrace a pipeline, each sigment comprising:*

*(1) a continuous, semicylindrical body of a galvanic anode metal;*

*(2) A metal core cathodic to the anode metal concentrically embedded entirely within the anode metal adjacent the inner periphery of said body;*

*(3) said core comprising:*

*(a) at least two axially-spaced, metal bars; and*

*(b) each of said bars having end portions projecting from opposite, longitudinal edges of the anode body to form joint elements for connecting one of said segments to the other in pipe-embracing relation.*

*7. A galvanic anode for cathodic protection of pipe lines, comprising:*

*(a) a pair of arcuate segments adapted to embrace a pipe line, each segment comprising:*

*(1) a continuous, arcuate body of a galvanic anode metal;*

*(2) A metal core cathodic to the anode metal concentrically embedded entirely within the anode metal adjacent the inner periphery of said body;*

*(3) said core comprising:*

*(a) at least two, axially-spaced metal bars;*

*(b) each of said bars having end portions projecting from opposite longitudinal edges of the anode body to form joint elements for connecting one of said segments to the other in pipe-embracing relation.*

*8. A galvanic anode according to claim 7, and*

*a plurality of angularly-spaced metal rods interlinking said bars.*

*9. An anode according to claim 7, wherein said anode metal is a member selected from the group consisting of aluminum, zinc, magnesium, and alloys thereof.*

*10. An anode according to claim 7, wherein said core is constructed of mild steel.*

*11. An anode according to claim 9, including electric current conductor elements connected to said core for electrically connecting the core to the pipeline.*

*12. An anode according to claim 11, wherein one of said end portions is offset laterally to receive the non-offset end portion of an opposed bar to form the joint therebetween.*

*13. A galvanic anode for cathodic protection of pipelines comprising:*

*a plurality of arcuate segments adapted to embrace a pipeline, each segment comprising:*

*(1) a continuous, arcuate body of a galvanic anode metal;*

*(2) a metal core cathodic to the anode metal concentrically and entirely embedded within the anode metal adjacent the inner periphery of said body;*

*(3) said core comprising:*

*(a) at least two, axially spaced-apart metal bars;*

*(b) each of said bars having end portions projecting from the opposed longitudinal edges of the said segments to form joint elements for connecting said segments to each other in pipe-embracing relation.*

*14. The anode according to claim 13, and*

*at least one metal rod in each segment for interlinking said bars.*

References Cited

The following references, cited by the Examiner, are of record in the patented file of this patent or the original patent.

UNITED STATES PATENTS

| | | | |
|---|---|---|---|
| 2,303,778 | 12/1942 | Wesley | 204—197 XR |
| 2,656,314 | 10/1953 | Osterheld | 204—197 |

OTHER REFERENCES

Cathodic Protection of Submarine Pipelines, 2 pp. pub. by Federated Metals Div. (1958).

FREDERICK, C. EDMUNDSON, Primary Examiner

U.S. Cl. X.R.

204—286